(12) United States Patent
Kori et al.

(10) Patent No.: US 11,558,239 B1
(45) Date of Patent: Jan. 17, 2023

(54) INTELLIGENT SYSTEM FOR NETWORK AND DEVICE PERFORMANCE IMPROVEMENT

(71) Applicant: CERNER INNOVATION, INC., Kansas City, KS (US)

(72) Inventors: Kotresh Kori, Bangalore (IN); Pavan Kumar R P, Bengaluru (IN); Jim S. Avazpour, Olathe, KS (US); Jason Miller, Garnett, KS (US); Volodymyr Polishchuk, Kansas City, MO (US); Bharath B K, Bangalore (IN); Devesh Singh, Bengaluru (IN); Vinay Bhat, Shivamogga (IN)

(73) Assignee: CERNER INNOVATION, INC., North Kansas City, MO (US)

( * ) Notice: Subject to any disclaimer, the term of this patent is extended or adjusted under 35 U.S.C. 154(b) by 0 days.

(21) Appl. No.: 17/463,148

(22) Filed: Aug. 31, 2021

(51) Int. Cl.
*H04L 41/0631* (2022.01)
*H04L 41/0677* (2022.01)
*H04L 41/0604* (2022.01)

(52) U.S. Cl.
CPC ........ *H04L 41/065* (2013.01); *H04L 41/0613* (2013.01); *H04L 41/0645* (2013.01); *H04L 41/0677* (2013.01)

(58) Field of Classification Search
CPC ............... H04L 41/065; H04L 41/0613; H04L 41/0645; H04L 41/0677
USPC ...................................................... 709/224
See application file for complete search history.

(56) References Cited

U.S. PATENT DOCUMENTS

| | | | | |
|---|---|---|---|---|
| 9,497,083 | B1 * | 11/2016 | Seger | H04L 12/185 |
| 10,601,640 | B1 * | 3/2020 | Das | H04L 41/0654 |
| 11,057,409 | B1 * | 7/2021 | Bisht | G06K 9/6282 |
| 11,258,679 | B2 * | 2/2022 | Grinkemeyer | H04L 43/0835 |
| 11,353,850 | B2 * | 6/2022 | Cella | G05B 23/0229 |
| 11,353,851 | B2 * | 6/2022 | Cella | H04L 1/0041 |
| 2016/0112886 | A1 * | 4/2016 | Malik | H04W 24/04 370/225 |
| 2017/0006135 | A1 * | 1/2017 | Siebel | G06N 20/00 |
| 2017/0061131 | A1 * | 3/2017 | Santos | H04W 12/128 |
| 2017/0093910 | A1 * | 3/2017 | Gukal | H04L 63/1416 |
| 2017/0223046 | A1 * | 8/2017 | Singh | H04L 63/1491 |
| 2017/0284691 | A1 * | 10/2017 | Sinha | F24F 11/30 |
| 2017/0285623 | A1 * | 10/2017 | Figoli | H04L 67/125 |
| 2017/0302505 | A1 * | 10/2017 | Zafer | H04L 41/40 |

(Continued)

*Primary Examiner* — Melvin H Pollack
(74) *Attorney, Agent, or Firm* — Shook, Hardy & Bacon LLP.

(57) ABSTRACT

Methods, systems, and computer-readable media are disclosed herein that monitor and improve network performance and reliability of a plurality of devices and nodes. In aspects, alert types are categorized based on the role, model, and operating system of a device or node within the network for which the alert was generated. A command set that is responsive to the alert and that is specially configured for the role, model, and operating system of the device or node is automatically selected to address the alert. The command set can be executed against the device or node (or neighboring device/node) in order to investigate the cause or source of the alert. Based on the results returned by the command set's execution, remediation actions can be selected and implemented to improve the technological performance (e.g., memory, CPU, connectivity) of the device or node in the network.

20 Claims, 16 Drawing Sheets

(56) References Cited

U.S. PATENT DOCUMENTS

| | | | | |
|---|---|---|---|---|
| 2018/0341760 | A1* | 11/2018 | Frempong | H04W 12/63 |
| 2019/0109849 | A1* | 4/2019 | Frempong | H04L 63/105 |
| 2019/0213068 | A1* | 7/2019 | Upadhyay | G06F 11/3034 |
| 2020/0099709 | A1* | 3/2020 | Vasseur | H04L 41/12 |
| 2021/0111942 | A1* | 4/2021 | Tahhan | H04L 41/0695 |
| 2021/0135943 | A1* | 5/2021 | Andrews | H04L 41/0893 |
| 2021/0135982 | A1* | 5/2021 | Chaturmohta | H04L 45/04 |
| 2021/0157312 | A1* | 5/2021 | Cella | H04L 1/0041 |
| 2021/0158106 | A1* | 5/2021 | Vasseur | H04L 41/147 |
| 2021/0288895 | A1* | 9/2021 | Wu | H04L 43/12 |
| 2021/0328886 | A1* | 10/2021 | Guim Bernat | H04L 41/5022 |
| 2021/0328933 | A1* | 10/2021 | Thyagaturu | H04L 41/40 |
| 2021/0352099 | A1* | 11/2021 | Rogers | G06F 16/252 |
| 2021/0392170 | A1* | 12/2021 | Kakinada | H04L 63/064 |
| 2022/0038330 | A1* | 2/2022 | Dutta | H04L 41/0895 |
| 2022/0053491 | A1* | 2/2022 | Sevindik | H04L 27/0002 |
| 2022/0078210 | A1* | 3/2022 | Crabtree | G06F 16/9024 |
| 2022/0141081 | A1* | 5/2022 | Kothuri | H04L 41/0866 |
| | | | | 709/224 |

* cited by examiner

| Alarm Id | Nodelabel | Inc Number | Assigned User Id | Info | Inc# close | Export | Timer | | | |
|---|---|---|---|---|---|---|---|---|---|---|
| 3942633 | ipsum_dolor01 | INC000034563188 | AB123456 | | | | | | | |
| 3961936 | porttitormassa02 | INC000034640787 | AB123457 | ⊙ | ⊙ | ⊙ | 5 | ↻ | ⊙ | △ |
| 3962585 | sed_pulvinar01 | INC000034644892 | AB123458 | ⊙ | ⊙ | ⊙ | 5 | ↻ | ⊙ | △ |
| 3964719 | nunc_viverra01 | INC000034657202 | AB123459 | ⊙ | ⊙ | ⊙ | 5 | ↻ | ⊙ | △ |
| 3985611 | fusceest01 | INC000034712803 | AB234567 | ⊙ | ⊙ | ⊙ | 5 | ↻ | ⊙ | △ |
| 3986256 | ac-turpis01 | INC000034714719 | AB234568 | ⊙ | ⊙ | ⊙ | 5 | ↻ | ⊙ | △ |

*FIG. 4.*

| Alarm Id | Severity | Node | Event Time | Coun... | Info | (x) | Suppress |
|---|---|---|---|---|---|---|---|
| 4197810 | CLEARED | sed_viverra02 | 202... 10T... | ra02 is up. | ℹ | 🔇 | 0 |
| 4172274 | MAJOR | ipsum_dolor01 | 202... 10T... | rd transition on peer 12.345.67.890 to erState=1 | ℹ | 🔇 | 0 |
| 4197801 | CLEARED | orci_mauris01 | 202... 10T... | AURIS01 is up. | ℹ | 🔇 | 0 |
| 4197800 | CLEARED | orci_mauris02 | 202... 10T... | AURIS02 is up. | ℹ | 🔇 | 0 |
| 4197808 | MAJOR | orci_aenean01 | 202... 10T... | rd transition on peer 3.456.789.012 to erState=1 | ℹ | 🔇 | 0 |
| 4197806 | CLEARED | sed_viverra01 | 202... 10T... | ra01 is up. | ℹ | 🔇 | 0 |
| 4197786 | CLEARED | fusceest01 | 202... 10T... | 1 is up. | ℹ | 🔇 | 0 |
| 4197786 | MAJOR | quis_magna02 | 202... | transition on peer 12.345.6.901 to state | | | |

All Active Alerts (334) | Assigned Alerts (372) | Suppressed Alarms (0)

Search

Create Remedy Ticket ✕

Template:
FIR_OC_INOC_VPN_Circuits

Notes:
QUIS_MA | quis_magna02 | BGP b

Summary:
QUIS_MA | quis_magna02 | BGP b

Submit | Close

```
This router is homed to the LEC 3 Scanner OF 1
^C inpo_rttior02:~ PD079281 $ 7/11/2021, 3:46:42 AM # sh bgp sum | b N Response:~
Neighbor V AS MsgRcvd MsgSent TblVer InQ OutQ Up/Down State/PfxRcd
12.34.567.89 4 65200 44100 7777 44100 5432 1 3 1 1 9 0 0 2y45w 549
23.456.7.901 4 64796 0 0 1 0 0 00:04:22 Idle
23.456.7.902 4 65101 0 0 1 0 0 00:04:23 Active inpo_rttior02:~ PD079281 $ 7/11/2021, 3:46:42 AM# show clock Response:~
17:17:08.853 CDT Sat Jul 10 2021 inpo_rttior02:~ PD079281 $ 7/11/2021, 3:46:42 AM# sh log

Response:~
Syslog logging: enabled (0 messages dropped, 15 messages rate-limited, 0 flushes, 0 overruns, xml disabled, filtering disabled)

No Active Message Discriminator.

No Inactive Message Discriminator.
```

*FIG. 11.*

OUTPUT CONSOLE

INCIDENT #: INC000035941025   Remedy Creation ⊙: 9 seconds   Cmd Exec ⊙:
12 seconds                                                           ⚠: PD079281

| done_claore02 |
| nonu_mmvauq01 |
| susp_endisse01 |
| dui_puruss01 |
| scel_erisqu01 |
| vul_putate01 |
| pret_iummat01 |
| maur_iseqet01 |
| nequ_atsemv01 |
| utn_onummy01 |
| fusc_ealiqu01 |

[ sh bgp sum | b N  ⌄ ]   [ Execute ]

inpo_rttion02:~ PD0792815 $ 7/11/2021, 3:46:42 AM# show run | sec banner

Response:~ Neighbor V AS MsgRcvd MsgSent Tbl Ver InQ OutQ Up/Down State/PfxRcd
12.34.567.89 4 65200 44100850 44100616 213119 0 0 2y45w 549
23.456.7.901 4 64796 0 0 1 0 0 00:06:51 Idle
23.456.7.902 4 65101 0 0 1 0 0 00:06:52 Idle inpo_rttion02:~ PD0792815 $ 7/11/2021, 3:46:42 AM# show run | sec banner Response:~
banner login ^CC
========================================================
{ The equipment now being accessed and information available through }
{ this equipment is confidential and proprietary. It may be accessed }

| New Records | Historical Records | | | | | | | |
|---|---|---|---|---|---|---|---|---|
| ID | Remedy INC# | Title | Associate | Date | Alert Type | Description | Follow Up | Follow Up Timer | Timer Left | Action |
| 10174 | INC000035941025 | INPO_RT \| inpo_rttior... | PD079281 | 2021-07-10 17:17:1 | New | Incident Title: INPO_RT \| inpo_rtti Actions Taken: Log Review Option | | | |

INTELLIGENT SYSTEM FOR NETWORK AND DEVICE PERFORMANCE IMPROVEMENT

TECHNICAL BACKGROUND

The present disclosure generally relates to a computer server system operating in a distributed network that connects a plurality devices.

BACKGROUND

Network, computer layer(s), and storage performance degrades and can be impaired when any quantity of devices connected to the network experience hardware and/or software failures, errors, and other issues (e.g., alerts or notifications for sub-optimal performance and/or connections, as well as impaired user interface functions and/or features).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present disclosure is defined by the claims as supported by the Specification, including the Detailed Description.

In brief and at a high level, this disclosure describes, among other things, methods, systems, and computer-readable media for monitoring network performance and implementing remediation actions to improve device and/or node performance. As will be described, aspects of the present disclosure described herein provide for automatically identifying and implementing remediation actions that are specific to alerts, based on device roles, device models, and device operating systems within the network.

BRIEF DESCRIPTION OF THE DRAWINGS

Aspects are described in detail below with reference to the attached drawings figures, wherein:

FIGS. 3-15 depict examples of graphical user interfaces in accordance with aspects of the present disclosure.

DETAILED DESCRIPTION

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects herein provide a system ingests a plurality of alerts comprised of various alert types occurring through a distributed network having many devices and/or nodes. By extracting device and/or node parameters from each alert, a specific set of computer commands (e.g., software package) can be automatically selected to investigate and/or diagnoses the device and/or node to which the alert corresponds. The system can leverage, integrate, and/or interface with additional tool(s), engine(s), and/or service(s) in order to securely access remote devices and/or nodes. Further, a remediation action can then be automatically selected or indicated that can be implemented to cure the source of the alert for that device and/or node in the network. The system provides these services automatically in response to a particular alert being selected for processing. As such, through a seamless graphical user interface, the selection of one alert causes the system to perform each of the above actions in order to aid in selection of and/or in order to automatically provide a remediation action to cure the source of the alert at a device and/or the node.

Figure 1:
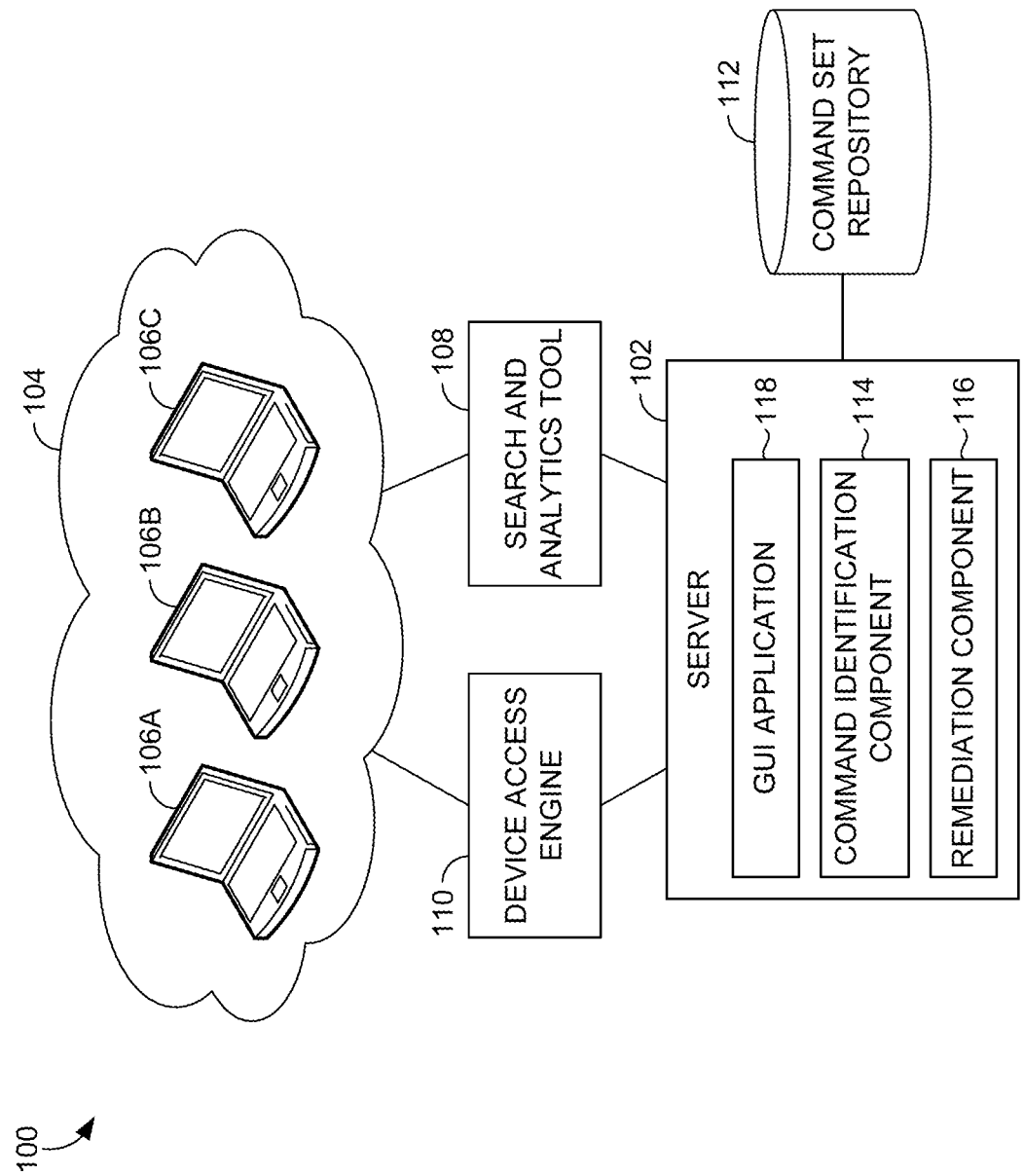
FIG. 1 is a block diagram of an example system suitable to implement aspects of the present disclosure.

FIG. 1 illustrates a system 100 for monitoring network performance, in accordance with aspects of the present disclosure. The system 100 includes a computing device, shown as a server 102 for simplicity in the example of FIG. 1. In aspects, the server may be physical server, a virtual server, or a cloud-based server, or any combination thereof. The server 102 is connected to a network 104 formed by a plurality of devices 106A, 106B, 106C. The server 102 is also connected to a search and analytics tool 108, a device access engine 110, and a command set repository 112, in various aspects. The server 102 is configured to perform methods, as discussed hereafter, by executing computer-readable instructions that are stored in non-transitory computer storage media, either locally at the server, remotely, or a combination thereof. For example, one or more portion(s) of the computer-readable instructions can be executed locally by a processor at the server 102 while one or more other portion(s) of the computer-readable instructions can be concurrently or simultaneously run by a processor of remote device(s) or nodes in the network 104.

In aspects, the server 102 is configured to receive a plurality of alerts. The alerts may be received via the search and analytics tool 108. Examples of a search and analytics tool 108 include ElasticSearch, Algolia, IBM Watson Discovery, Apache Solr™, and Coveo®. The alerts may be streamed into the search and analytics tool 108, may arrive in batches or packets, may be retrieved intermittently or periodically, and/or any combination thereof. For each of the plurality of alerts received (and/or selected by a user through a graphical user interface for processing), the server 102 extracts a device role, a device model, and an operating system of a device that is associated with the alert. For simplicity, the terms "device" and "node" are used interchangeably herein to refer to devices and components in the network, which can be comprised of hardware and/or software. The plurality of devices 106A, 106B, 106C act as nodes within the network 104, albeit some nodes in the network 104 may not comprise a physical device or hardware, but may instead correspond to software, such as a firewall. Examples of devices and/or nodes include a computing device, a server, a router, a firewall, a load balancer, a port, and a switch.

The server 102 and/or the command identification component 114 of the server 102 can identify that the alert is a particular or "first" alert type based on one or more of the device role, the device model, and the operating system of the device associated with the alert. In further embodiments, the server 102 and/or the command identification component 114 of the server 102 can identify that the alert is a particular alert type based on a combination of the device role, the device model, and the operating system of the device associated with the alert. The command identification component 114 of the server 102 identifies a command set that is associated with the first alert type. The command set includes a device integrity command, an interrogation command, or both. The server 102 and/or the command identification component 114 of the server 102 can retrieve the command set from the command set repository 112. The server 102 then communicates the command set for the first alert type to the device access engine 110, wherein the device access engine 110 facilitates execution of the device integrity command and the interrogation command for the device associated with the alert. Examples of the device access engine 110 include a platform that gathers and analyzes infrastructure monitoring inventory, that automatically provisions devices for monitoring, that can secure access or login to devices, that executes commands when securely accessing devices, that can ingest and/or export monitoring assurance data and inventory feeds, that can visualize or trace impact paths between devices, or any combination thereof. Such a platform, for example, can perform discovery, remediation, and/or provisioning functions for a plurality of devices connected to a network. In some aspects, the server 102 communicates the device integrity command, the interrogation command, and a unique identifier of the device associated with the alert to the device access engine 110. The device access engine 110 can identify the device and one or more relationships of the device to one or more network components. Further, the device access engine 110 directly and securely accesses the device to execute the device integrity command, the interrogation command, and/or both against the device, at the device, and/or relative to neighboring node(s) in the network 104. The device access engine 110, in some instances, includes or accesses a mapping of the network 104, including one or more devices, nodes, and/or components as well as the existing relationships, dependencies, and/or connections among them. The device access engine 110 can securely login to any and all of the devices, nodes, and/or components using one or more layers of encryption. Once the device access engine 110 has accessed the particular device by secure means, the device access engine 110 can run the command set in order to generate results, data, and/or information that can be used downstream to remediate the alert at issue.

The server 102 receives a device integrity result and an interrogation result from the device access engine 110 in response to execution of the device integrity command and the interrogation command for the device associated with the alert. The remediation component 116 identifies a remediation action for the device associated with the first alert type, based on the result(s). In particular, the remediation action is identified as specifically correcting a performance-impairing characteristic of the operating system or the device/node that causes the first alert type. A performance-impairing characteristic can include outdated software, partially-corrupted code/files, sub-optimal operation settings, and the like. The remediation action that is identified by the server 102 and/or the remediation component 116 is selected or determined based on the device integrity result and the interrogation result received the device access engine 110.

In further aspects, based on the device integrity result and/or the interrogation result, the server 102 and/or the remediation component 116 instantiate the remediation action for the device associated with the alert. In another aspect, based on the device integrity result and/or the interrogation result, the server 102 and/or the remediation component 116 recommend the remediation action for the device associated with the alert. In one such aspect, an indication can be received from a user via the graphical user interface application 118. The indication identifies that the remediation action (that was recommended) is to be instantiated and/or is being instantiated based on the device integrity result and/or the interrogation result. The remediation action can then be communicated to or "pushed" the device associated with the alert, via the device access engine 110. The remediation action (as instantiated) includes executing the installation of a software package at the device that corrects a cause of the alert.

Having described the system 100 and components thereof, it will be understood by those of ordinary skill in the art that system 100 is but one example of a suitable system and is not intended to limit the scope of use or functionality of the present disclosure. Similarly, system 100 should not be interpreted as imputing any dependency and/or any requirements with regard to each component and combination(s) of components illustrated in FIG. 1. It will be appreciated by those of ordinary skill in the art that the location of components illustrated in FIG. 1 is an example, as other methods, hardware, software, components, and devices for establishing a communication links between the components shown in FIG. 1, may be utilized in implementations of the present disclosure. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should be not be interpreted as limiting the present disclosure to exclude additional components and combination(s) of components. Moreover, though components are represented in FIG. 1 as singular components, it will be appreciated that some aspects may include a plurality of devices and/or components such that FIG. 1 should not be considered as limiting the number of a device or component.

Figure 2:
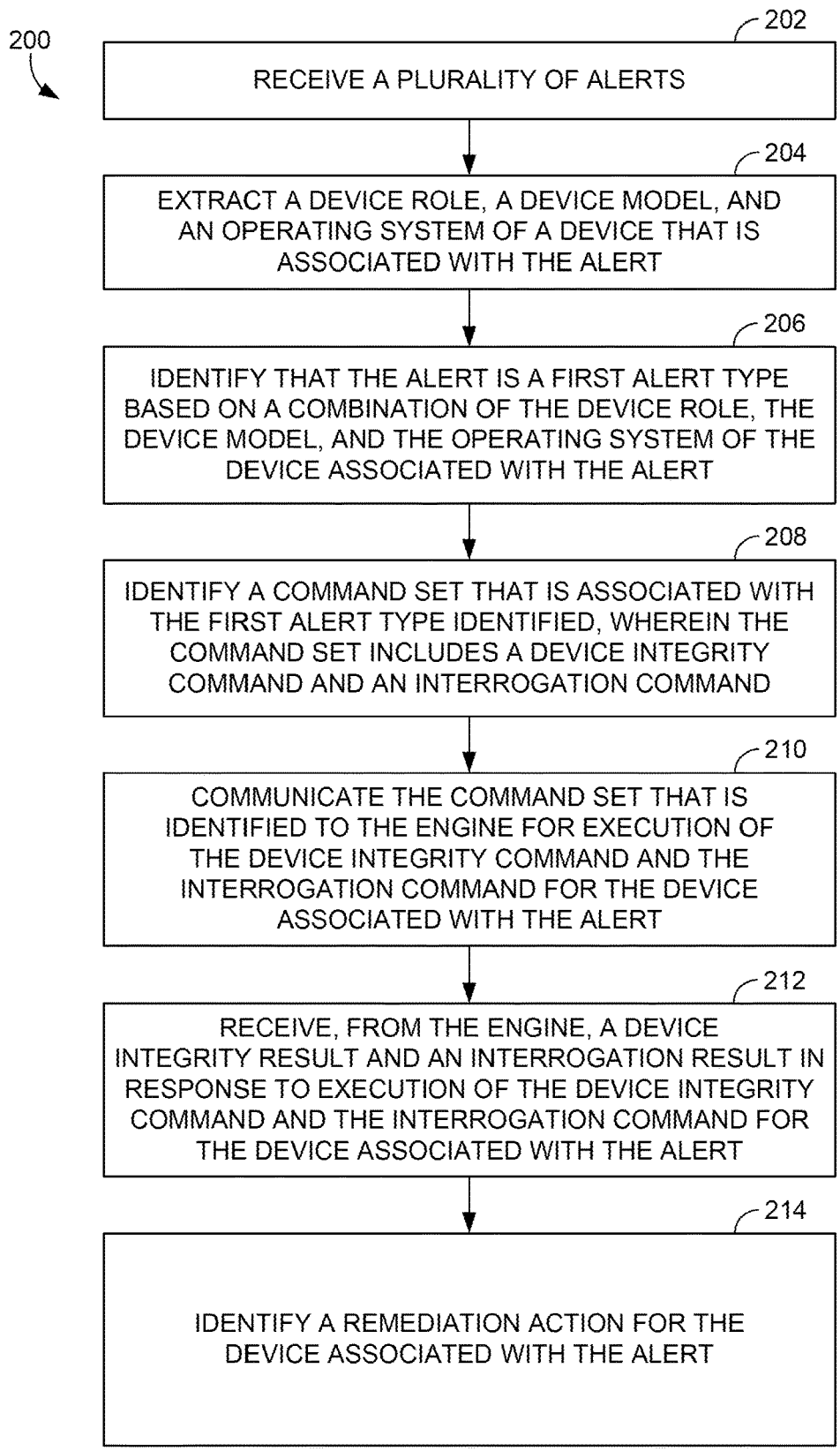
FIG. 2 a flow diagram showing an example method in accordance with an aspect of the present disclosure.

FIG. 2 depicts a computerized method for monitoring network performance, in accordance with aspects of the present disclosure. The method 200 may be a computer-implemented method, in various aspects. One or more non-transitory computer-readable storage medium having computer-readable program code and/or instructions embodied thereon can be used to implement the method 200. The computer-readable program code and/or instructions may correspond to features and functions discussed above with regard to FIG. 1. In various aspects, the method 200 described herein is performed autonomously without user interaction to remediate causes of the plurality of alerts for a plurality of devices in the network.

At block 202, a plurality of alerts are received. Each alert is assigned a unique identifier that can be used to identify, track, and/or differentiate that alert from other alerts occurring in the network. A timestamp can also be recorded with each alert, wherein the timestamp indicate the exact date and time when the alert was generated and/or was received. The timestamp and/or the unique identifier can be assigned to each alert by the search and analytics tool 108 of FIG. 1, for example. Each alert can also be associated with a particular device and/or node, as well as the unique identifier assigned to that device and/or node, for example, where the alert was generated due to an error, malfunction, or degraded performance occurring at that particular device in the network. The unique identifier of the alert and the unique identifier of the device/node can be different and can be associated with one another in the system 100 of FIG. 1, for example. An alert generally refers to an automatically detected, generated, and reported notification for one or more devices that operate within or that communicate with the network. The alerts may correspond to different types of alerts that are triggered by different thresholds and monitoring, for example, performed and/or filtered by the search and analytics tool 108 of FIG. 1. The alert can specify the particular error, malfunction, or degraded performance that was recorded and/or that has occurred for the particular device in the network, such as "log message" for example.

For each of the plurality of alerts received, the information contained in and/or communicated with the alert, such as device role, device model, operating system, Simple Network Management Protocol (SNMP) data, and/or keyword (e.g., in a log message), can be extracted. At block 204, the device role, device model, and operating system of the device that is associated with the alert are extracted from the alert. Then, at block 206, the alert is identified as being a particular or "first" alert type based on a device role within a network for a device associated with the alert, a device model of the device associated with the alert, and an operating system of the device associated with the alert. The device role refers to the function of the particular device as operating within or as operating in connection with a network. For example, a device role describes whether the particular devices functions and performs as a router, a firewall, a switch, a load balancer, a user end-point, or the like, in the network. Generally, a device model is used to describe the make and model of particular device. An operating system refers to the type of operating system (OS) that the device utilizes when operating within or as operating in connection with a network. Each combination of device role, device model, and operating system is associated with a unique alert type, in some aspects. For example, the combination of a router (device role), 16123456 (model type of that router), and Cisco IOS® (operating system of that router) might be identified as an alert type "XYZ". In another example, the combination of a router (device role), model no. 16987654 (model type or identifying model number of that router), and Juniper JUNOS® (operating system of that router) might be identified as an alert type "EFG". In various aspects, multiple combinations of device role, device model, and operating system can all be associated with the same alert type (i.e., some combinations may be grouped into the same alert type) whereas some other combinations of device role, device model, and operating system are associated with another distinct and unique alert type. The plurality of alert types can be predefined as associated with one or more specific combinations of device role, device model, and operating system. In such aspects, the server 102 of FIG. 1, for example, can access and/or store knowledge of alert types.

At block 208, a command set is identified that is associated with the first alert type, wherein the command set includes a device integrity command and an interrogation command. The command set may be identified by the command identification component 114 of FIG. 1, in some aspects. A command set refers to a set of computer-readable and computer-executable instructions that are specific to and/or are particular configured for installation/execution at the device based on the combination of device role, device model, and operating system is associated with said device, and/or based on the alert type. The command set(s) discussed herein generally include one or more of a device integrity command and/or an interrogation command. It will be understood that the term "first" or other sequential term such as "second" are used herein merely to differentiate between types and kinds, and are not intended to designate relative severity, nor are these terms intended to be temporally or sequentially limiting, unless expressly described as such. Accordingly, the first alert type is different from the second, third, and n-th alert types that can be identified and assigned by the system and methods discussed herein for various combinations of role, model, and/or operating system, for example.

A device integrity command is a set of computer-readable and computer-executable instructions that, when executed against the device and/or node, acts as a conditional check on the technological health of the device. For example, when the alert was issued for a particular load balancer, a device integrity command can be identified for execution to determine the technological health for the particular load balancer. For example, the device integrity command may investigate whether the load balancer (or other device) includes functions such as a debugging mode and/or packet capture, and/or include characteristics or logs such as a total quantity of active/orphaned sessions. The device integrity command determines whether subsequent execution of an interrogation command is predicted to cause the device and/or node to fail, "crash", and/or suffer a technological impairment. In other words, by executing the device integrity command, the system of FIG. 1, for example, can determine whether subsequent execution of the interrogation command itself for that device and/or node may cause a technological failure or network disruption for the device and/or node. In this manner, the device integrity command may act as a pre-check or conditional stress-test on the device and/or node that can ensure the "integrity" of the device and/or node. The device integrity command can be specific to the device role, device model, operating system, specific alert type, and/or any combination thereof for the device associated with the alert. An interrogation command is a set of computer-readable and computer-executable instructions that interrogates the device and/node to investigate the cause or source of the alert at issue. The interrogation command can be specific to the device role, device model, operating system, specific alert type, and/or any combination thereof for the device for which the alert was generated.

At block 210, the command set that is identified is communicated to an engine for execution of the device integrity command and the interrogation command for the device associated with the alert. In some aspects, the device integrity command, the interrogation command, and a unique identifier of the device (associated with the alert) is communicated to the device access engine 110 of FIG. 1, for example. The device access engine can identify one or more relationships of that one device to one or more other device(s), node(s), and/or component(s) in the network. The device access engine can directly and securely access the device (e.g., automatically logging into the device) to execute the device integrity command and the interrogation command the results of which can be communicated or pushed by to the server 102 of FIG. 1, for example. In some instances, the device integrity command is executed first, and only when the device integrity command is successful does the device access engine proceed to execute the interrogation command at the device. When the device integrity command is not successful, the device access engine does not proceed to execute the interrogation command at the device, in such aspects.

A device integrity result and an interrogation result are received from the device access engine (such as device access engine 110 of FIG. 1) at block 212, in response to execution of the device integrity command and the interrogation command for the device associated with the alert. A device integrity result includes data and/or information responsive to the executed device integrity command, and an interrogation result includes data and/or information responsive to the executed interrogation command. The device integrity result and/or the interrogation result can be displayed via the graphical user interface application 118 of FIG. 1, in some aspects. In one aspect, at block 214, a remediation action is identified for the device that is associated with the alert. The remediation component 116 of FIG. 1, for example, may identify the remediation action for the particular alert type and based on the device/node-specific results. In some aspects, an indication is received from a user, via user into to an application, where the indication identifies a remediation action to instantiate based on the device integrity result and the interrogation result. The remediation action includes executing an installation of a software package the device, wherein the software package corrects a cause of the alert.

In some aspects, based on the device integrity result and the interrogation result, a remediation action for the device associated with the alert is automatically instantiated in the system, is manually instantiated through user feedback/indications entered using the graphical user interface application 118 of FIG. 1, and/or is displayed via the graphical user interface application as a recommendation for selection and implementation by a user.

Figure 3:
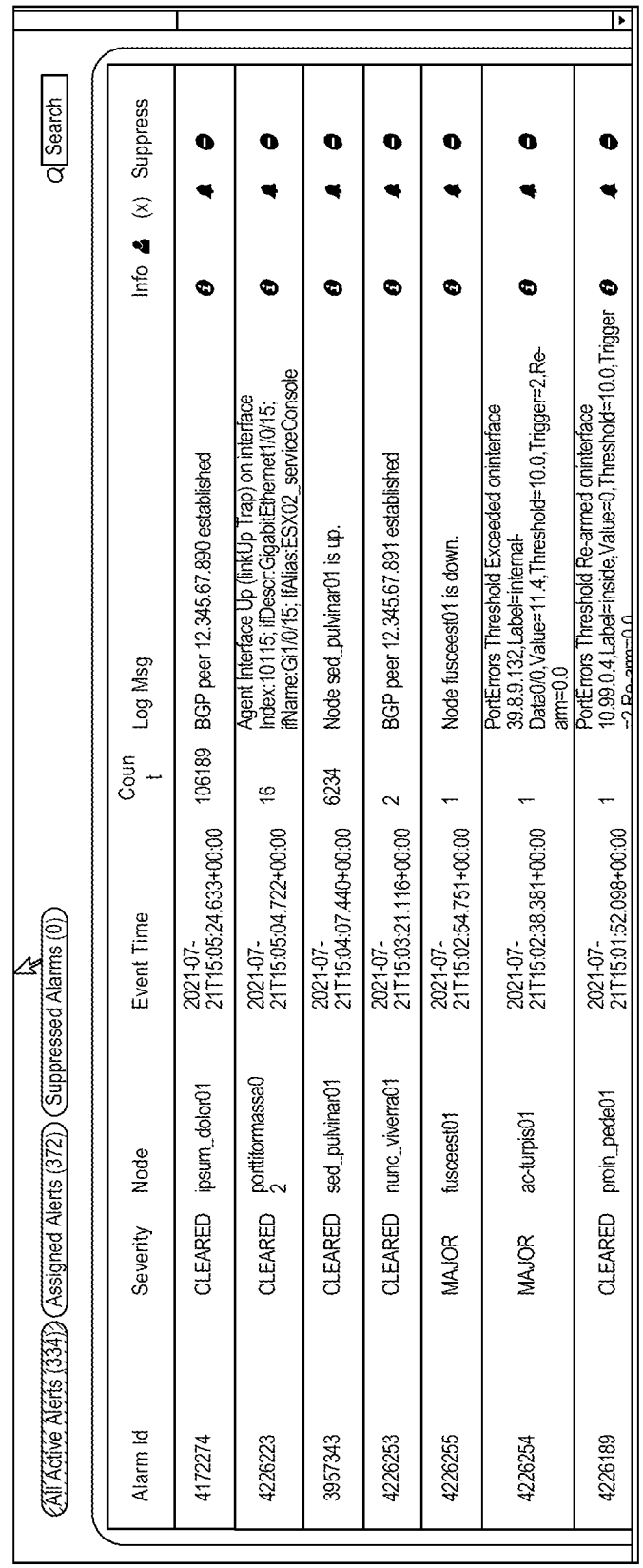

Turning to FIG. 3, an example graphical user interface 300 presents a plurality of alerts that have been received. The alerts can be presented along with their unique alert identifier (e.g., alarm ID"), a device and/or node identifier, a log message of the alert, a timestamp of the alert, and additional information (e.g., severity/status, count). The graphical user interface 300 shown in FIG. 3 has the "All Active Alerts" display option selected. In FIG. 4, the "Assigned Alerts" displays option is selected, such that only those active alerts that have been assigned to a user for remediation are presented. In FIG. 4, the assigned user's identifier is shown for the corresponding alert in the example graphical user interface 400. The user can toggle between Assigned Alerts display option and the All Active Alerts display option seamlessly with a simple selection.

Figure 6:
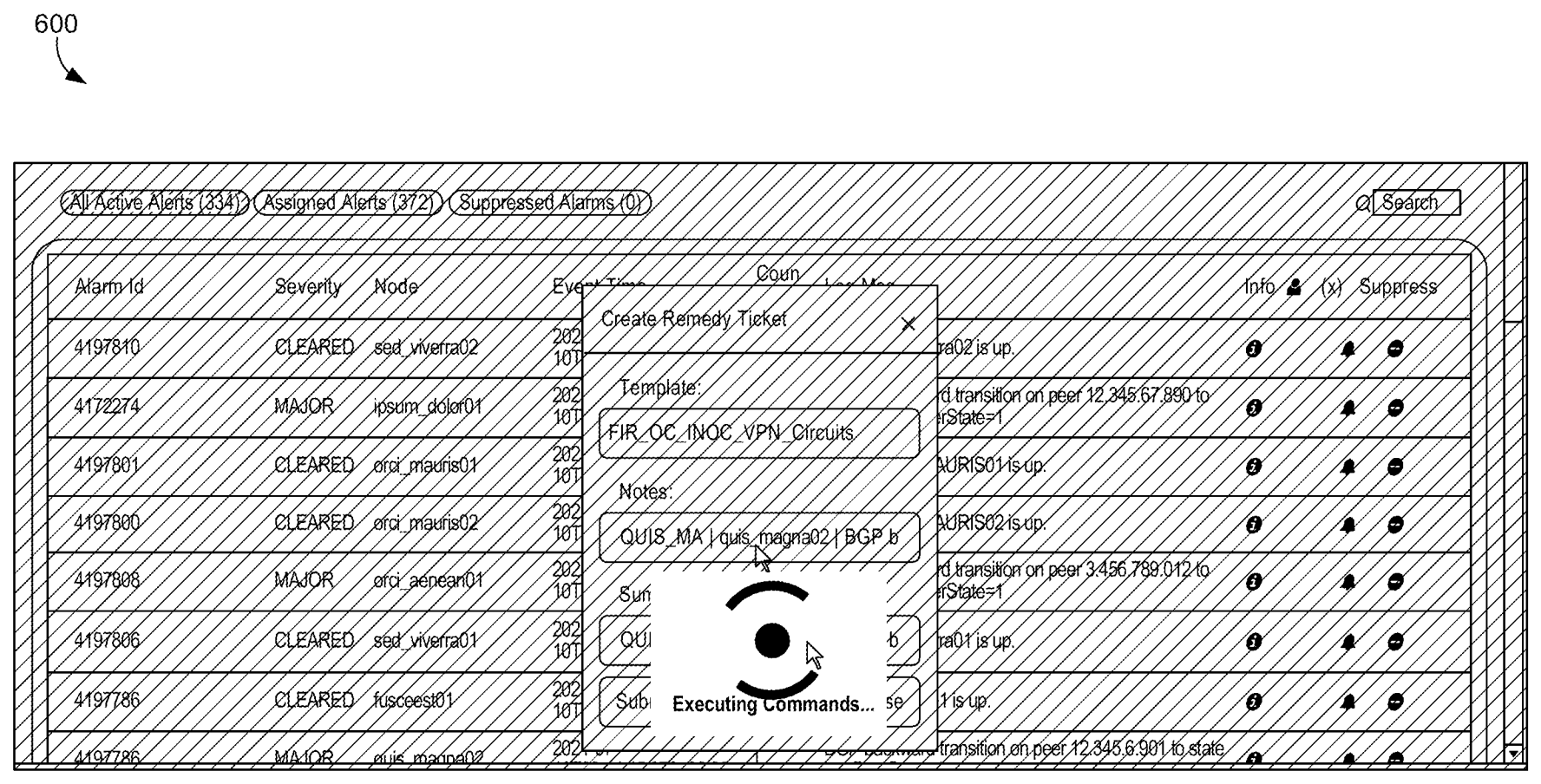
Figure 7:
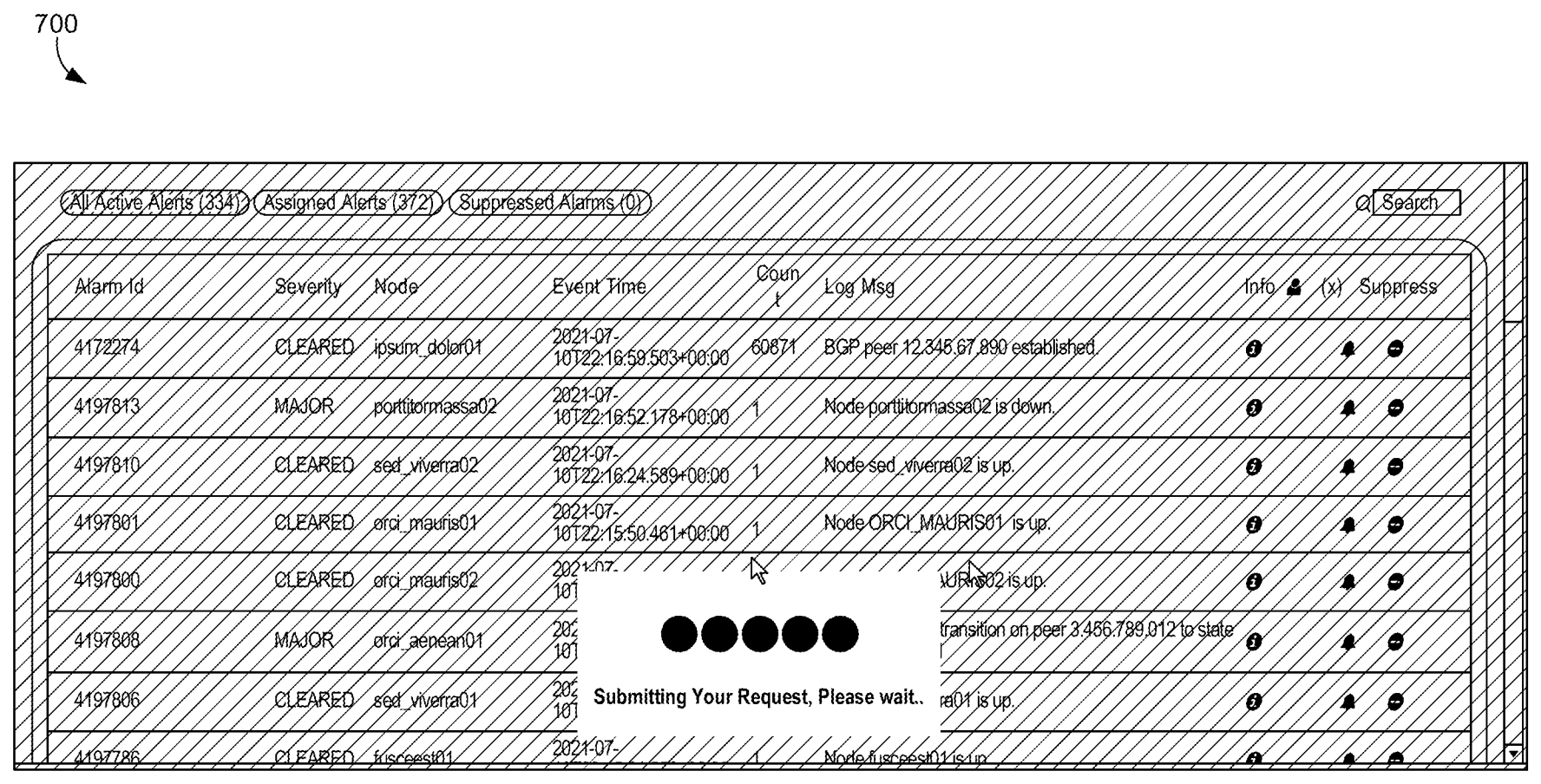
Figure 8:
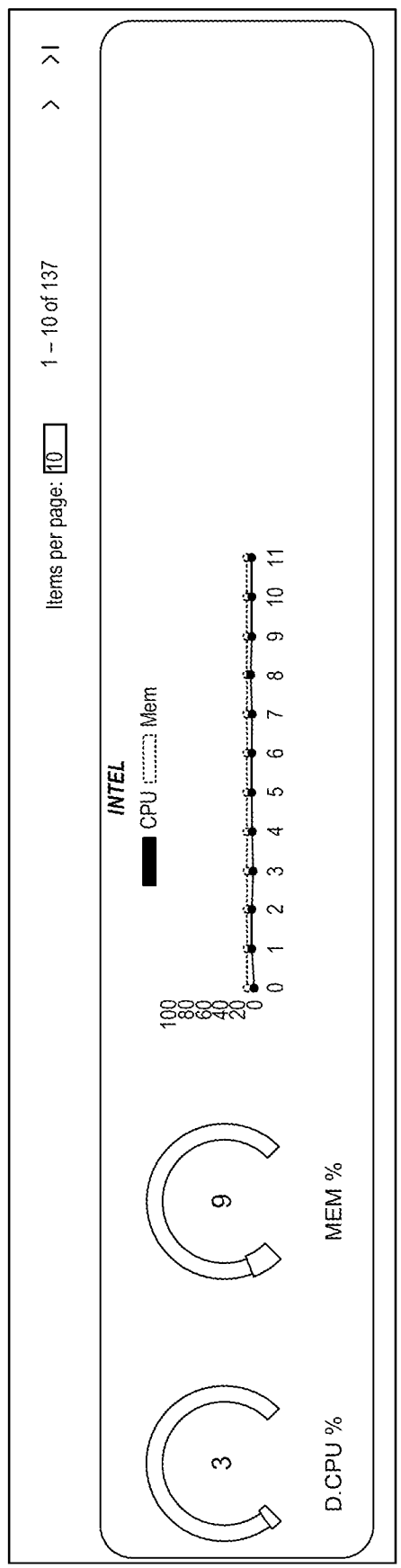
Figure 9:
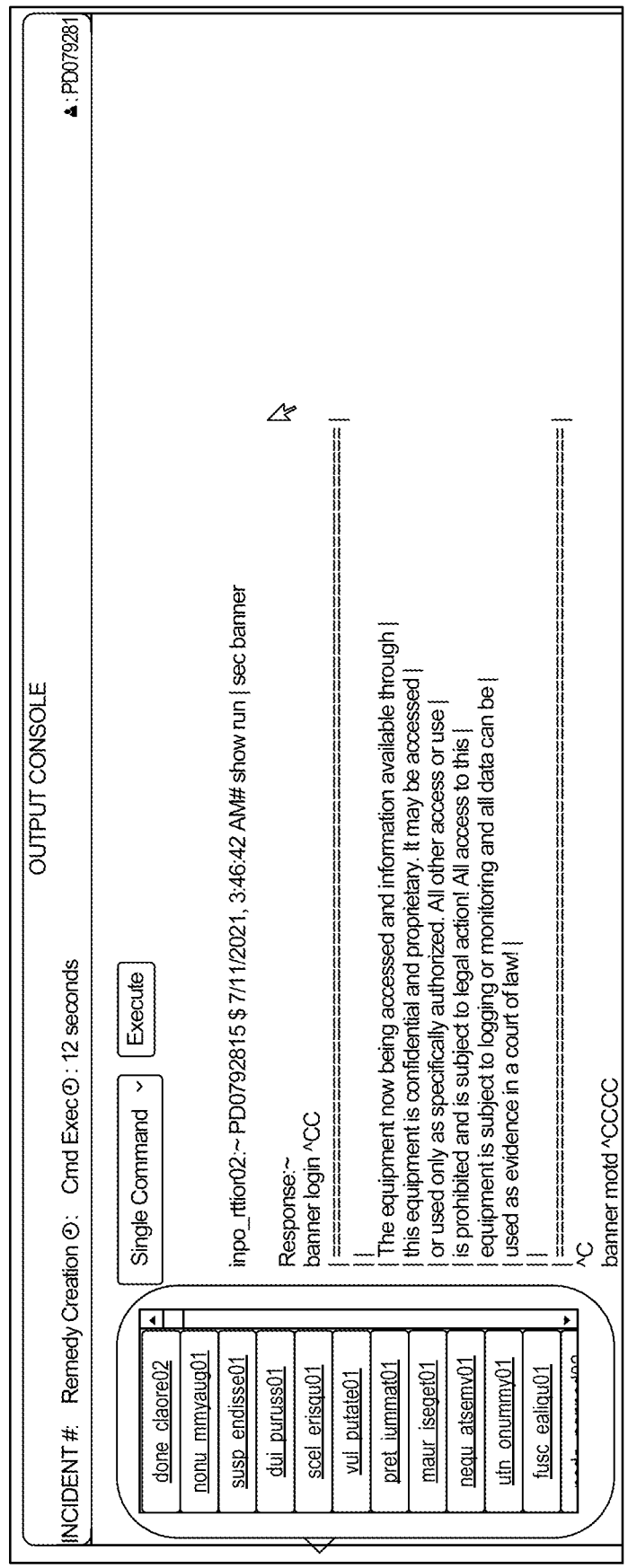
Figure 10:
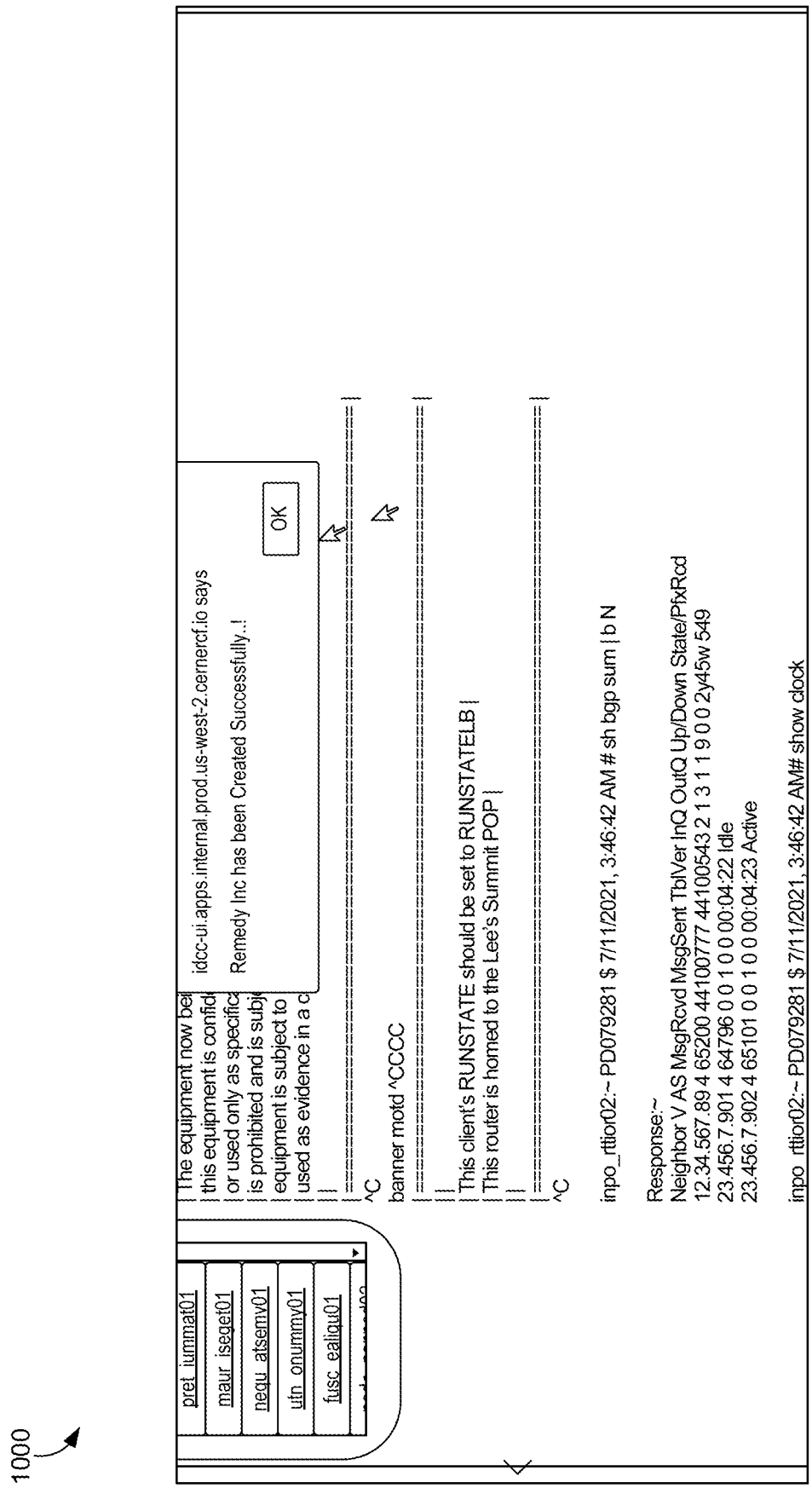

From the All Active Alerts display option shown in FIG. 3, a single alert can be selected. When selected, a popup window is automatically displayed, as shown in the graphical user interface 500 of FIG. 5. A user can select and/or manually enter information, select a submit button, in order to create a remediation record or "ticket" for the particular alert. In response to the submission, the device role, a device model, and the operating system of the device associated with the alert are automatically extracted from the alert. Further, the type of the alert is automatically identified based on the device role, a device model, and the operating system. Additionally, a command set that is associated with the alert type identified and communicated to an engine for execution at or against the device associated with the alert, which can be located using the device and/or node identifier. The engine can securely access the device and execute the command set, wherein an indication is automatically presented in the graphical user interface 600 of FIG. 6 to show the progress of the process. The remediation record or "ticket" for the particular alert is also automatically processed, as shown in the graphical user interface 700 of FIG. 7, based on the command execution. Further, a device integrity result and an interrogation result are received and displayed based on execution of the command set. For example, the graphical user interface 300 of FIG. 3 is again presented, wherein the alert that was addressed is updated with a severity status of "Cleared". Additionally, a user can scroll downward to view additional display panels related to the alert. For example, FIG. 8 is an example display panel is shown as presenting a device integrity result, which includes memory and central processing unit (CPU) utilization of the device and/or node against which the command set was executed by the engine. The display panel can be automatically populated with this information. Scrolling down further, an additional panel is displayed in FIG. 9, which presents an interrogation result. In FIGS. 9 through 12, detailed information and data of the interrogation result are presented, as well as a pop-up confirmation of the remediation record. In FIG. 13, a user can execute additional interrogation commands against the device to investigate the alert further.

Figure 14:
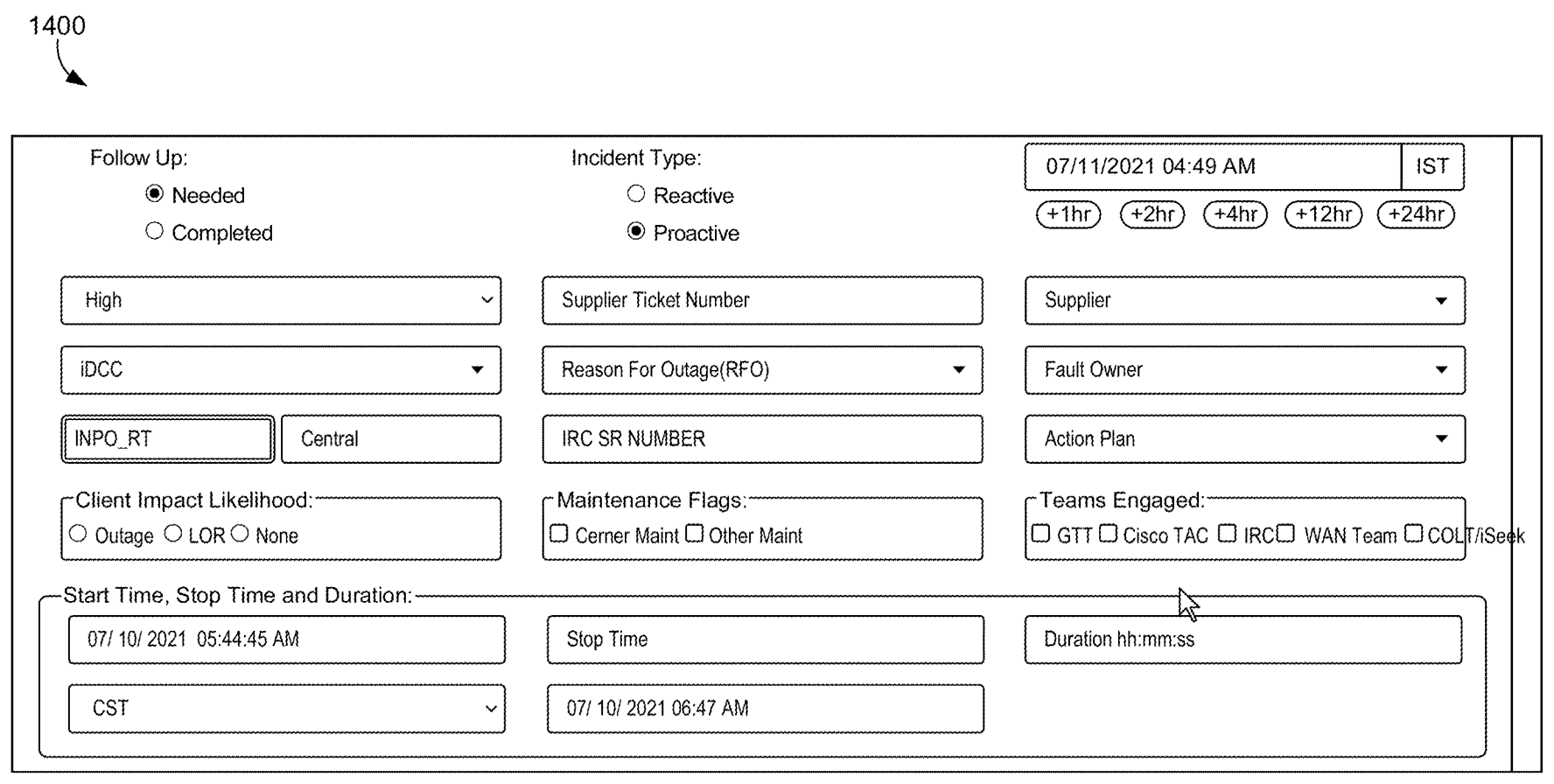
Figure 15:
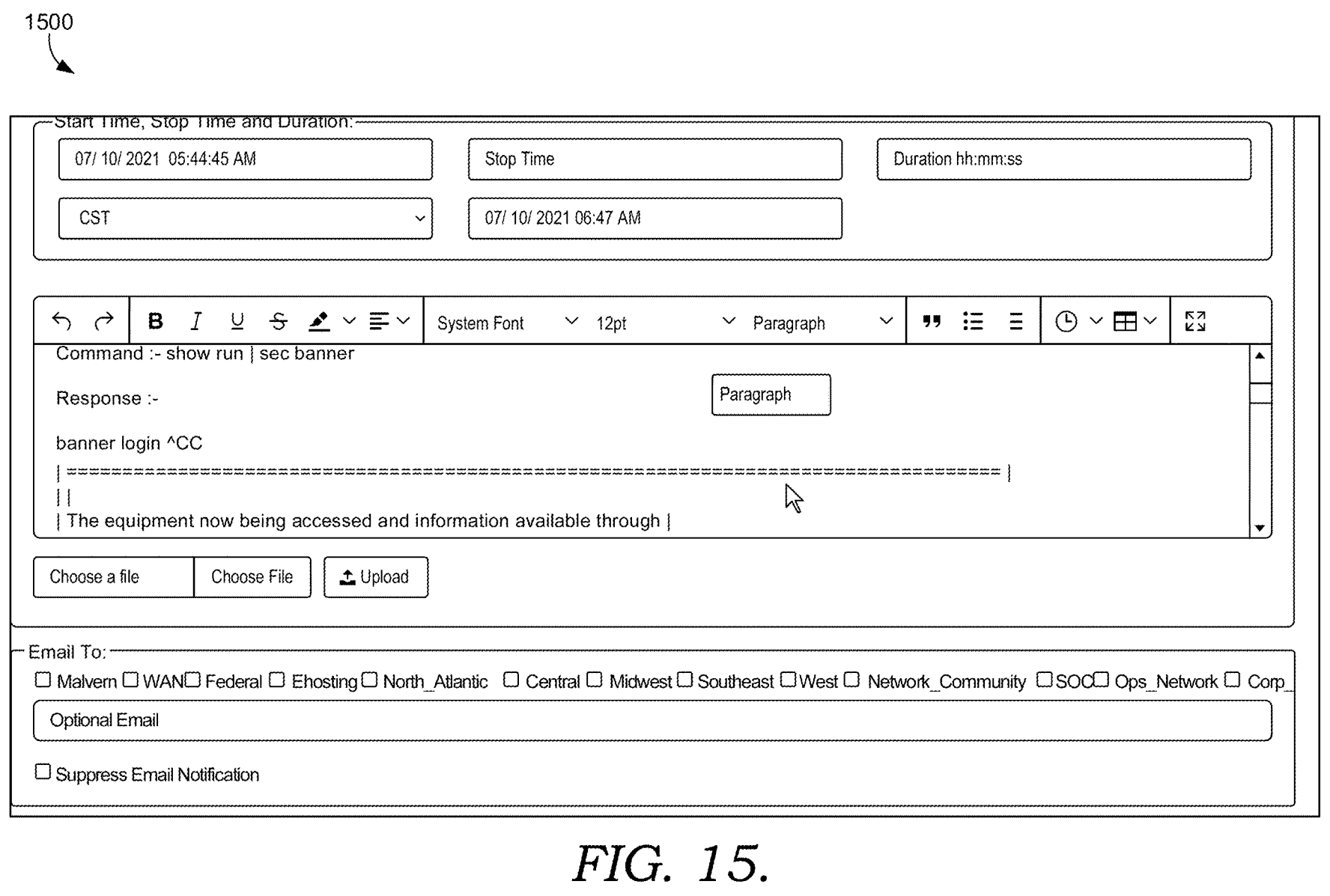

Additionally, information from the graphical user interfaces 800, 900, 1000, 1100, and 1200 of FIGS. 8 through 12 can be imported and/or recorded in related and/or downstream applications. For example, interrogation results can be populated into new records, such as the example new record shown in the graphical user interface 1300 of FIG. 13. When such a new record is edited, as shown in the graphical user interfaces 1300, 1400, and 1500 of FIGS. 13-15, details from the interrogation results (e.g., shown in FIGS. 9-12) can be manually or automatically entered, for example, in one such related and/or downstream application.

Figure 16:
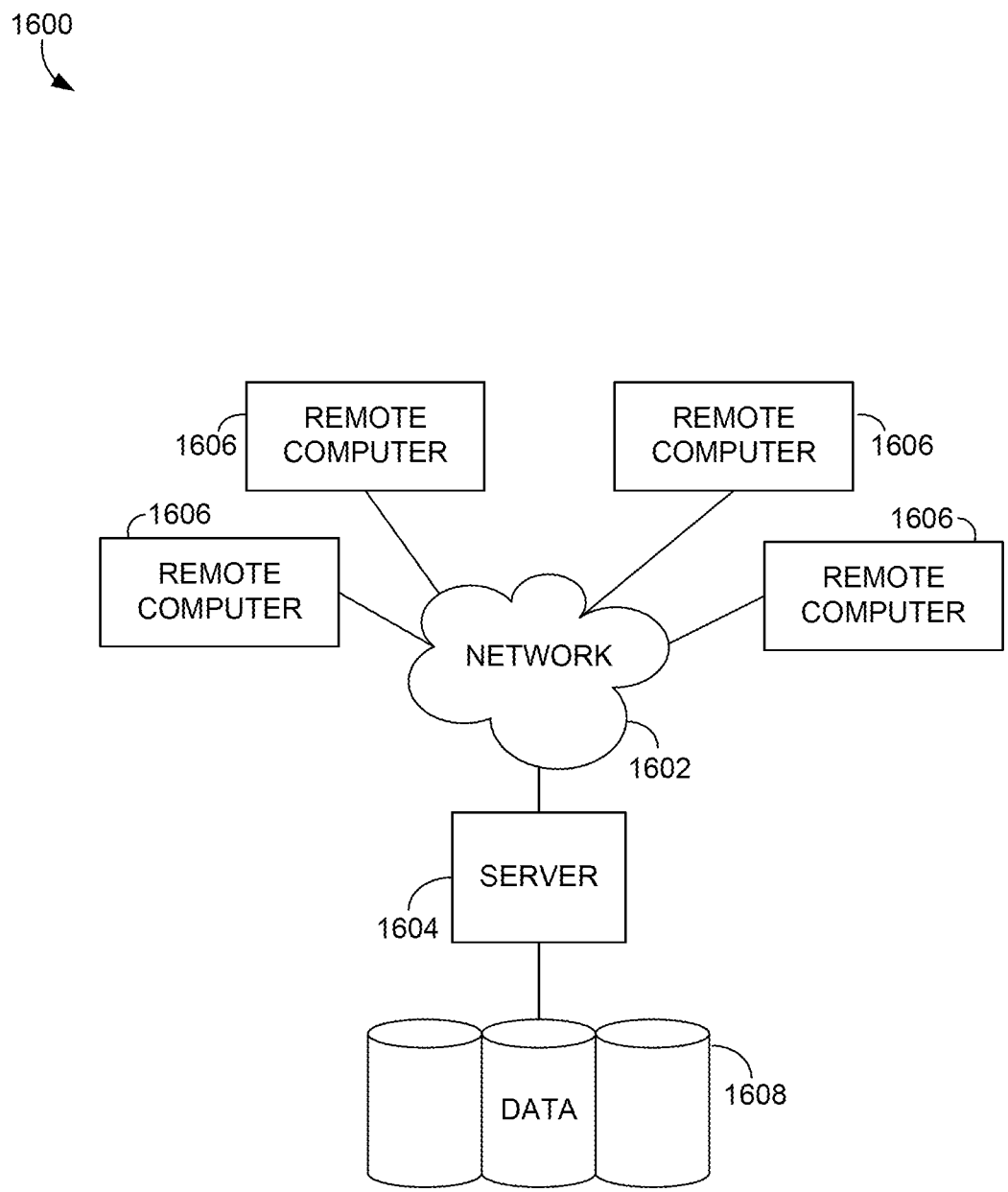
FIG. 16 depicts an example computing environment in accordance with aspects of the present disclosure.

Turning now to FIG. 16, an example computing environment 1600 is depicted, in accordance with an aspect of the present disclosure. It will be understood by those of ordinary skill in the art that the exemplary computing environment 1600 is just one example of a suitable computing environment and is not intended to limit the scope of use or functionality of the present disclosure. Similarly, the computing environment 1600 should not be interpreted as imputing any dependency and/or any requirements with regard to each component and combination(s) of components illustrated in FIG. 16. It will be appreciated by those having ordinary skill in the art that the connections illustrated in FIG. 16 are also exemplary as other methods, hardware, software, and devices for establishing a communications link between the components, devices, systems, and entities, as shown in FIG. 16, may be utilized in implementation of the present disclosure. Although the connections are depicted using one or more solid lines, it will be understood by those having ordinary skill in the art that the exemplary connections of FIG. 16 may be hardwired or wireless, and may use intermediary components that have been omitted or not included in FIG. 16 for simplicity's sake. As such, the absence of components from FIG. 16 should be not be interpreted as limiting the present disclosure to exclude additional components and combination(s) of components. Moreover, though devices and components are represented in FIG. 16 as singular devices and components, it will be appreciated that some aspects may include a plurality of the devices and components such that FIG. 16 should not be considered as limiting the number of a device or component.

Continuing, the computing environment 1600 of FIG. 16 is illustrated as being a distributed environment where components and devices may be remote from one another and may perform separate tasks. The components and devices may communicate with one another and may be linked to each other using a network 1602. The network 1602 may include wireless and/or physical (e.g., hardwired) connections. Exemplary networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 1602, generally, provides the components and devices access to the Internet and web-based applications.

The computing environment 1600 comprises a computing device in the form of a computing device 1604. Although illustrated as one component in FIG. 16, the present disclosure may utilize a plurality of local servers and/or remote servers in the computing environment 1600. The computing device 1604 may include components such as a processing unit, internal system memory, and a suitable system bus for coupling to various components, including a database or database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA®) local bus, and Peripheral Component Interconnect (PCI) bus, also known as Mezzanine bus.

The computing device 1604 may include or may have access to computer-readable media. Computer-readable media can be any available media that may be accessed by computing device 1604, and includes volatile and nonvolatile media, as well as removable and non-removable media. By way of example, and not limitation, computer-readable media may include computer storage media and communication media. Computer storage media may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the computing device 1604. Computer storage media does not comprise signals per se.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

In aspects, the computing device 1604 uses logical connections to communicate with one or more remote computers 1606 within the computing environment 1600. In aspects where the network 1602 includes a wireless network, the computing device 1604 may employ a modem to establish communications with the Internet, the computing device 1604 may connect to the Internet using Wi-Fi or wireless access points, or the server may use a wireless network adapter to access the Internet. The computing device 1604 engages in two-way communication with any or all of the components and devices illustrated in FIG. 16, using the network 1602. Accordingly, the computing device 1604 may send data to and receive data from the remote computers 1606 over the network 1602.

Although illustrated as a single device, the remote computers 1606 may include multiple computing devices. In an aspect having a distributed network, the remote computers 1606 may be located at one or more different geographic locations. In an aspect where the remote computers 1606 is a plurality of computing devices, each of the plurality of computing devices may be located across various locations such as buildings in a campus, medical and research facilities at a medical complex, offices or "branches" of a banking/credit entity, or may be mobile devices that are wearable or carried by personnel, or attached to vehicles or trackable items in a warehouse, for example.

In some aspects, the remote computers 1606 is physically located in a medical setting such as, for example, a laboratory, inpatient room, an outpatient room, a hospital, a medical vehicle, a veterinary environment, an ambulatory setting, a medical billing office, a financial or administrative office, hospital administration setting, an in-home medical care environment, and/or medical professionals' offices. By way of example, a medical professional may include physicians; medical specialists such as surgeons, radiologists, cardiologists, and oncologists; emergency medical technicians; physicians' assistants; nurse practitioners; nurses; nurses' aides; pharmacists; dieticians; microbiologists; laboratory experts; genetic counselors; researchers; veterinarians; students; and the like. In other aspects, the remote computers 1606 may be physically located in a non-medical setting, such as a packing and shipping facility or deployed within a fleet of delivery or courier vehicles.

Continuing, the computing environment 1600 includes a data store 1608. Although shown as a single component, the data store 1608 may be implemented using multiple data stores that are communicatively coupled to one another, independent of the geographic or physical location of a memory device. Exemplary data stores may store data in the form of artifacts, server lists, properties associated with servers, environments, properties associated with environments, computer instructions encoded in multiple different computer programming languages, deployment scripts, applications, properties associated with applications, release packages, version information for release packages, build levels associated with applications, identifiers for applications, identifiers for release packages, users, roles associated with users, permissions associated with roles, workflows and steps in the workflows, clients, servers associated with clients, attributes associated with properties, audit information, and/or audit trails for workflows. Exemplary data stores may also store data in the form of electronic records, for example, electronic medical records of patients, transaction records, billing records, task and workflow records, chronological event records, and the like.

Generally, the data store 1608 includes physical memory that is configured to store information encoded in data. For example, the data store 1608 may provide storage for computer-readable instructions, computer-executable instructions, data structures, data arrays, computer programs, applications, and other data that supports the functions and action to be undertaken using the computing environment 1600 and components shown in exemplary FIG. 16.

In a computing environment having distributed components that are communicatively coupled via the network 1602, program modules may be located in local and/or remote computer storage media including, for example only, memory storage devices. Aspects of the present disclosure may be described in the context of computer-executable instructions, such as program modules, being executed by a computing device. Program modules may include, but are not limited to, routines, programs, objects, components, and data structures that perform particular tasks or implement particular abstract data types. In aspects, the computing device 1604 may access, retrieve, communicate, receive, and update information stored in the data store 1608, including program modules. Accordingly, the computing device 1604 may execute, using a processor, computer instructions stored in the data store 1608 in order to perform aspects described herein.

Although internal components of the devices in FIG. 16, such as the computing device 1604, are not illustrated, those of ordinary skill in the art will appreciate that internal components and their interconnection are present in the devices of FIG. 16. Accordingly, additional details concerning the internal construction device are not further disclosed herein.

The present disclosure has been described in relation to particular aspects, which are intended in all respects to be illustrative rather than restrictive. Further, the present disclosure is not limited to these aspects, but variations and modifications may be made without departing from the scope of the present disclosure.

What is claimed is:

1. A computerized method for monitoring network performance, the method comprising:
   receiving a plurality of alerts;
   for each of the plurality of alerts received:
   identifying the alert is a first alert type, wherein the first alert type is specific to a device role within a network for a device associated with the alert, a device model of the device associated with the alert, and an operating system of the device associated with the alert;
   identifying a command set that is specific to the first alert type identified, wherein the command set includes a device integrity command and an interrogation command;
   communicating the command set that is identified to an engine for execution of the device integrity command and the interrogation command for the device associated with the alert; and
   receiving, from the engine, a device integrity result and an interrogation result in response to execution of the device integrity command and the interrogation command for the device associated with the alert.

2. The computerized method of claim 1 further comprising:
   based on the device integrity result and the interrogation result, instantiating a remediation action for the device associated with the alert.

3. The computerized method of claim 1 further comprising:
   based on the device integrity result and the interrogation result, recommending a remediation action for the device associated with the alert.

4. The computerized method of claim 1 further comprising:
   receiving an indication from a user, wherein the indication identifies a remediation action to instantiate based on the device integrity result and the interrogation result, recommending the remediation action for the device associated with the alert.

5. The computerized method of claim 1 wherein the device integrity command is executed to determine whether execution of the interrogation command is predicted to cause the device to fail.

6. The computerized method of claim 1 further comprising:
   communicating the device integrity command, the interrogation command, and a unique identifier of the device associated with the alert to the engine, wherein the engine identifies a relationship of the device to a component in the network, and wherein the engine directly and securely accesses the device to execute the device integrity command and the interrogation command.

7. The computerized method of claim 1 wherein the method is performed autonomously without user interaction to remediate causes of the plurality of alerts for a plurality of devices in the network.

8. One more non-transitory computer-readable media having computer-executable instructions embodied thereon that, when executed, perform a method for monitoring network performance, the media comprising:
   receiving a plurality of alerts;
   for each of the plurality of alerts received:
   extracting a device role, a device model, and an operating system of a device that is associated with the alert;
   identifying the alert is a first alert type, wherein the first alert type is specific to a combination of the device role of the device associated with the alert, the device model of the device associated with the alert, and the operating system of the device associated with the alert;
   identifying a command set that is specific to the first alert type identified, wherein the command set includes a device integrity command and an interrogation command;
   communicating the command set that is identified to an engine for execution of the device integrity command and the interrogation command for the device associated with the alert;
   receiving, from the engine, a device integrity result and an interrogation result in response to execution of the device integrity command and the interrogation command for the device associated with the alert; and
   identifying a remediation action for the device associated with the alert, wherein the remediation action is identified as specifically correcting a performance-impairing characteristic of the operating system or the device that causes the first alert type.

9. The media of claim 8 further comprising:
   based on the device integrity result and the interrogation result, instantiating the remediation action for the device associated with the alert, wherein the remediation action includes executing an installation of a software package at the device, wherein the software package corrects a cause of the alert.

10. The media of claim 8 further comprising:
based on the device integrity result and the interrogation result, recommending the remediation action for the device associated with the alert, wherein the remediation action includes executing an installation of a software package the device, wherein the software package corrects a cause of the alert.

11. The media of claim 8 further comprising:
receiving an indication from a user, wherein the indication identifies the remediation action to be instantiated based on the device integrity result and the interrogation result, wherein the remediation action includes executing an installation of a software package, wherein the software package corrects a cause of the alert.

12. The media of claim 8 wherein the interrogation command interrogates the device to investigate the cause of the alert at issue.

13. The media of claim 8 further comprising:
communicating the device integrity command, the interrogation command, and a unique identifier of the device associated with the alert to the engine, wherein the engine identifies a relationship of the device to a component in a network, and wherein the engine directly and securely accesses the device to execute the device integrity command and the interrogation command against the device.

14. The media of claim 8 wherein the instructions are performed autonomously without user interaction to resolve the plurality of alerts.

15. A system for monitoring network performance, the system comprising:
a server that is connected to an engine and connected to a network formed by a plurality of devices, the server being configured to:
receive a plurality of alerts;
for each of the plurality of alerts received:
extract a device role, a device model, and an operating system of a device that is associated with the alert;
identify the alert is a first alert type, wherein the first alert type is specific to a combination of the device role of the device associated with the alert, the device model of the device associated with the alert, and the operating system of the device associated with the alert;
identify a command set that is specific to the first alert type identified, wherein the command set includes a device integrity command and an interrogation command;
communicate the command set that is identified to the engine for execution of the device integrity command and the interrogation command for the device associated with the alert;
receive, from the engine, a device integrity result and an interrogation result in response to execution of the device integrity command and the interrogation command for the device associated with the alert; and
identify a remediation action for the device associated with the alert, wherein the remediation action is identified as specifically correcting a performance-impairing characteristic of the operating system or the device that causes the first alert type.

16. The system of claim 15 further comprising:
based on the device integrity result and the interrogation result, instantiating the remediation action for the device associated with the alert.

17. The system of claim 15 further comprising:
based on the device integrity result and the interrogation result, recommending the remediation action for the device associated with the alert.

18. The system of claim 15 further comprising:
receiving an indication from a user, wherein the indication identifies the remediation action to instantiate based on the device integrity result and the interrogation result, an communicating the remediation action to the device associated with the alert.

19. The system of claim 15 wherein the server autonomously performs as configured without user interaction to resolve the plurality of alerts for the plurality of devices in the network.

20. The system of claim 15 further comprising:
communicating the device integrity command, the interrogation command, and a unique identifier of the device associated with the alert to the engine, wherein the engine identifies a relationship of the device to one or more network components, and wherein the engine directly and securely accesses the device to execute the device integrity command and the interrogation command.

* * * * *